United States Patent
Chinea et al.

(10) Patent No.: US 8,189,478 B2
(45) Date of Patent: May 29, 2012

(54) METHOD FOR THE OPTIMIZED TRANSMISSION OF DATA BURSTS BETWEEN A SENDING AND A RECEIVING NETWORK NODE

(75) Inventors: Estibaliz Bear Chinea, Ulm (DE); Miguel De Vega Rodrigo, Brussels (BE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 253 days.

(21) Appl. No.: 10/585,713

(22) PCT Filed: Jan. 4, 2005

(86) PCT No.: PCT/EP2005/050009
§ 371 (c)(1),
(2), (4) Date: Jul. 25, 2008

(87) PCT Pub. No.: WO2005/067224
PCT Pub. Date: Jul. 21, 2005

(65) Prior Publication Data
US 2008/0273529 A1 Nov. 6, 2008

(30) Foreign Application Priority Data
Jan. 12, 2004 (DE) .......................... 10 2004 001 691

(51) Int. Cl.
G01R 31/08 (2006.01)
H04L 12/54 (2006.01)
H04J 3/12 (2006.01)
G08C 25/02 (2006.01)

(52) U.S. Cl. ......... 370/236; 370/428; 370/522; 714/748
(58) Field of Classification Search .................. 370/229, 370/230, 232, 351, 352, 355, 395.1, 395.2, 370/395.21, 428, 429, 464, 477, 498, 522, 370/528, 236; 398/43; 714/748
See application file for complete search history.

(56) References Cited

U.S. PATENT DOCUMENTS

| | | | |
|---|---|---|---|
| 5,398,129 A | 3/1995 | Reimann | |
| 7,397,792 B1 * | 7/2008 | Beshai et al. | 370/355 |
| 7,535,841 B1 * | 5/2009 | Beshai et al. | 370/230.1 |
| 2003/0035433 A1 * | 2/2003 | Craddock et al. | 370/429 |
| 2003/0099243 A1 * | 5/2003 | Oh et al. | 370/395.21 |
| 2003/0137972 A1 | 7/2003 | Kowalewski | |
| 2008/0165688 A1 * | 7/2008 | Beshai et al. | 370/232 |

FOREIGN PATENT DOCUMENTS
EP 1 089 498 A2 4/2001

* cited by examiner

Primary Examiner — Ricky Ngo
Assistant Examiner — Paul H Masur
(74) Attorney, Agent, or Firm — Laurence A. Greenberg; Werner H. Stemer; Ralph E. Locher

(57) ABSTRACT

The invention relates to an optical data burst transmission method. An emitted network node obtains, together with a confirmation signal, information regarding the length of time of after which blocking no longer occurs and/or information indicating when the connection path is free. The emitted network node can be immediately emitted after an actual emitted data burst, another data burst and after other bursts. As a result, waiting time between the bursts is prevented and the available transmission capacity is used in an optimal manner. The probability of blocking is also reduced as is the necessary signaling information.

14 Claims, 3 Drawing Sheets

METHOD FOR THE OPTIMIZED TRANSMISSION OF DATA BURSTS BETWEEN A SENDING AND A RECEIVING NETWORK NODE

CROSS REFERENCE TO RELATED APPLICATIONS

This application is the US National Stage of International Application No. PCT/EP2005/050009, filed Jan. 4, 2005 and claims the benefit thereof. The International Application claims the benefits of German Patent application No. 10 2004 001 691.7 filed Jan. 12, 2004. All of the applications are incorporated by reference herein in their entirety.

FIELD OF THE INVENTION

The invention relates to a method for the optimized transmission of data bursts according to the preamble of the claims.

BACKGROUND OF THE INVENTION

What is termed Optical Burst Switching (OBS) will be employed for transmitting data over future optical networks. This entails combining a plurality of data packets into what are termed data bursts and then transmitting them over a data channel in the optical network. Each data channel corresponds to a specific wavelength of a wavelength multiplex signal having a multiplicity of said channels over which data signals are transmitted simultaneously. Different messages from different sources can be transmitted over each data channel. There will be longer delays in the sending of data bursts when the traffic volume is higher because fewer free timeslots will be available for transmitting them. Optimal utilization of the available transmission capacity, and hence a reduced probability of blocking, is a major aim in said networks. The probability of blocking is reduced by a "Two-Way-Reservation OBS Network" (2WR OBS) in which a reservation request is sent by the sending network node and the acknowledgement that the connection path is free is sent by a receiving network node.

In what is termed λ switching, where a plurality of wavelengths (channels) are available, the switching granularity is a wavelength. An entire transmission channel will consequently be occupied even when the traffic volume is low. So this method is not optimal, either.

SUMMARY OF THE INVENTION

The object of the invention is to improve the transmission capacity of an especially optical [sic] data network, in particular of an optical data network.

Said object is achieved by means of a method having the features of the claims.

Developments of the method are described in the dependent claims.

The main advantage ensues from the reduced waiting times (GAPs) between the data bursts sent. The sending network node receives information indicating as of when a possible blocking will be cleared or, as the case may be, the connection path will be free. One data burst after another can consequently be transmitted with no intermediate waiting time. The method can be applied generally and used in conjunction with, for example, the known OBS reservation methods HORIZON and JET.

BRIEF DESCRIPTION OF THE DRAWINGS

Exemplary embodiments of the invention will be described in more detail with reference to figures, in which.

DETAILED DESCRIPTION OF THE INVENTION

Figure 1:
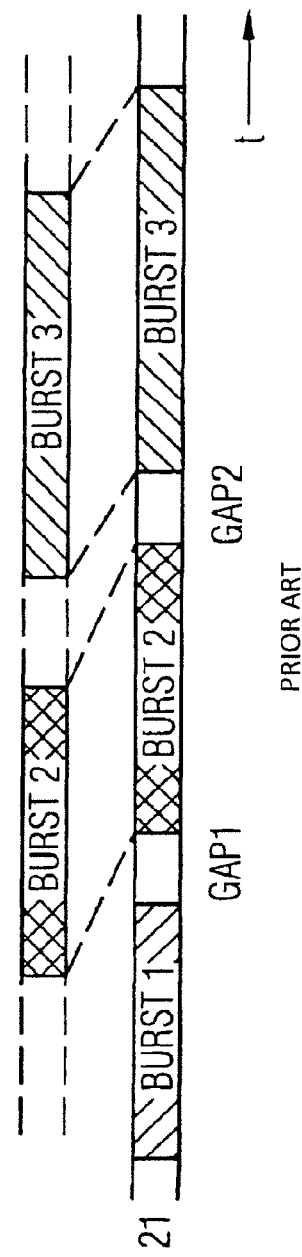
FIG. 1 shows burst transmitting according to a known method.

The customary "Two-Way-Reservation OBS" will be described first with reference to FIG. 1. Said figure shows the sending of 3 consecutive data bursts BURST1 to BURST3 over a data channel identified by λ1. In the customary method a header that contains a reservation request (REQ—FIG. 3) and generally reaches the receiving end node over a plurality of switching devices is sent by the sending end node. If the connection path is free, the sending end node will in response to its request receive an acknowledgement signal (ACK—Acknowledge, FIG. 3) after a waiting time and will then be able to send its data burst. When, according to FIG. 1, bottom line, the first data burst BURST1 has been sent, in a customary "Two-Way-Reservation OBS" a reservation request will be sent in the next header by the sending end node and an associated acknowledgement signal thereupon received, whereupon—after the end of the first data burst and after an unused waiting time GAP1—a second data burst BURST2 will be sent. The top line in FIG. 1 therein shows the earliest possible sending of the data burst in all cases. The third data burst BURST3 (top line), which in turn can only be sent after a further waiting time GAP2, overlaps the second data burst BURST 2 sent. A waiting time GAP1, GAP2, . . . consequently occurs each time between the data bursts. Said waiting times correspond to unused transmission capacity.

Figure 2:
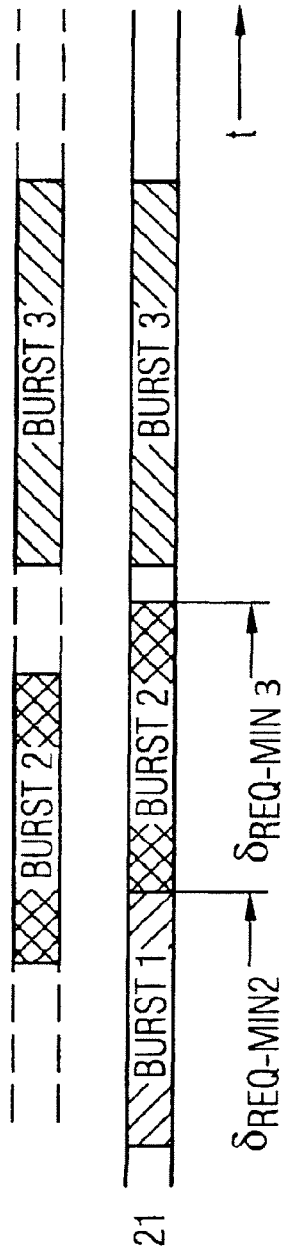
FIG. 2 shows burst transmitting according to the novel method.

FIG. 2 shows data burst transmitting according to the novel method. Even while the first data burst BURST1 is being transmitted the sending end node will be notified through the indication of a blocking time $\delta_{REQ\text{-}MIN}$ of the time as of when there will be no more blocking. The network's switching devices and the receiving end node have been informed about the blocking time in progress and will notify the sending end node of this in the acknowledgement signal. On the basis of the blocking time $\delta_{REQ\text{-}MIN2}$ the sending end node will then know when possibly existing blocking will be cleared and the connection will be free for transmitting the second data burst BURST2, in this case immediately after the end of the first data burst. The first waiting time GAP1 does not, therefore, arise and the second data burst BURST2 will be sent with no further delay. The third data burst BURST3 could likewise be sent immediately after the blocking time $\delta_{REQ\text{-}MIN3}$, after the end of blocking by the second data burst BURST2. BURST3 is, however, not completely present at that time (top line) and so will not be sent until it is complete. The transmission capacity will be increased sufficiently by the novel method to allow the amount of data occurring to be transmitted problem-free in the example shown. In extreme cases there will be no waiting times at all.

The signaling overhead can, moreover, be reduced through the novel method. If, in a customary "Two-Way Reservation", the sending end node is informed by way of the acknowledgement information ACK (FIG. 3) that the transmission path is not free, then the sending network node will have to send the relevant header possibly several times until informed by the acknowledgement information that the transmission path is free. This continuous signaling information will be rendered superfluous by employing the inventive method wherein the sending end node knows exactly as of when the transmission path will be free and it will be able to send the next data burst.

Figure 3:
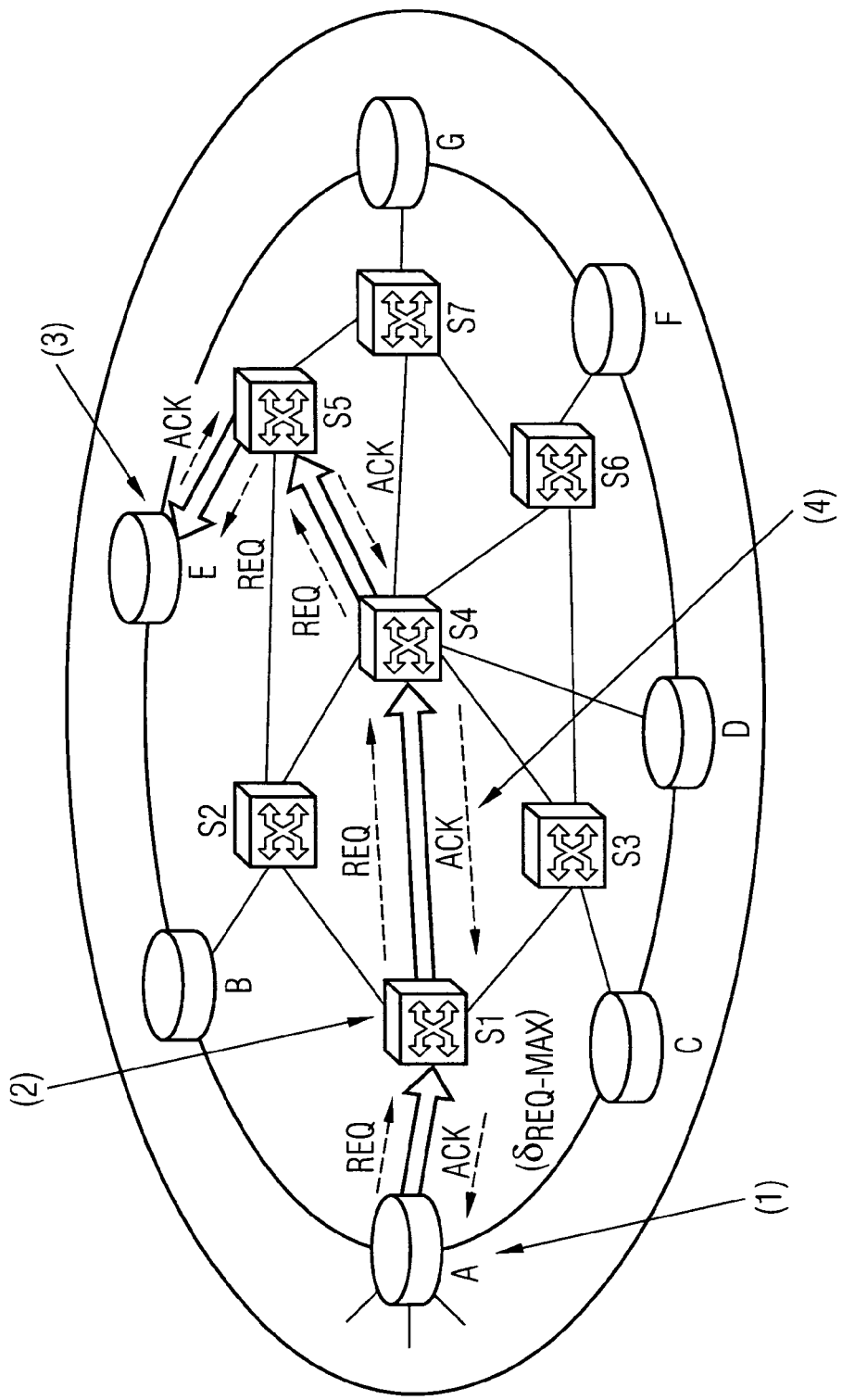
FIG. 3 shows an optical data network.

FIG. 3 shows a data network having different end nodes A to G via which switching devices S1 to S7 are connected to each other. A plurality of users can be connected to each end node, as is indicated symbolically for the end nodes A and E through user lines. The end node A wishes to transmit data bursts to the end node E. It therefore first sends E a bandwidth reservation request REQ containing time information $\delta_{REQ=0}$, meaning that the data burst is to be sent as soon as possible, in a header via the switching devices S1, S4, and S5. Each switching device checks whether transmission capacity can be reserved for said data burst. Not only a positive or negative response is expected in the case of the novel method, however. If the response is negative, accordingly meaning that the data burst cannot be sent immediately, the response will contain the waiting time $\delta_{REQ-MIN}$, referred to as the blocking time, that indicates a length of blocking by other burst transmissions and which the burst data requiring to be sent will therefore still have to spend in the end node A before it can be sent.

The connection setup will now be described step by step with reference to FIG. 3.

In a first step (1) the end node A sends E its request REQ in a header containing—as already mentioned—the time information $\delta_{REQ}=0$.

In a second step (2) each switching device S1, S4, S5 affected by the transmission checks whether the data burst requiring to be transmitted will overlap one being transmitted and after what length of time $\delta$ transmitting of the current data burst—blocking—will have ended and an available connection A-E have been established. The first affected switching device S1 forwards the longest blocking time $\delta_{REQ}$=max ($\delta_{REQ}$, $\delta$) to the next switching device S4 in the header containing the reservation request REQ. This operation is repeated in the switching device S4 and the further switching devices, in this case only in the further switching device S5. Each switching device determines the longest of the blocking times on the individual transmission sections and inserts this into its header.

In a third step (3) the reservation request reaches the end node E, which determines the blocking time $\delta_{REQ-MIN}$ of the entire connection A-E.

In a fourth step (4) the end node E then sends an acknowledgement ACK indicating said longest blocking time $\delta_{REQ-MIN}$ to the end node A, thereby informing it of when transmission capacity will be available and it can send its data burst.

Along the path of the acknowledgement information ACK through the switching devices S5, S4, and S1, transmission capacity is reserved between A and E for the data burst requiring to be sent. The described method is referred to as the HORIZON algorithm.

Said method can be implemented using different variants. For example, an alternative to calculating the longest blocking time is for all blocking times present in the individual switching devices to be inserted and the receiving end node E to determine the longest blocking time of the connection A-E for the sending end node A. All that is important for any of the variants is that the sending end node A receives an acknowledgement containing a time specification from which it can determine the waiting time before sending its data burst.

Figure 4:
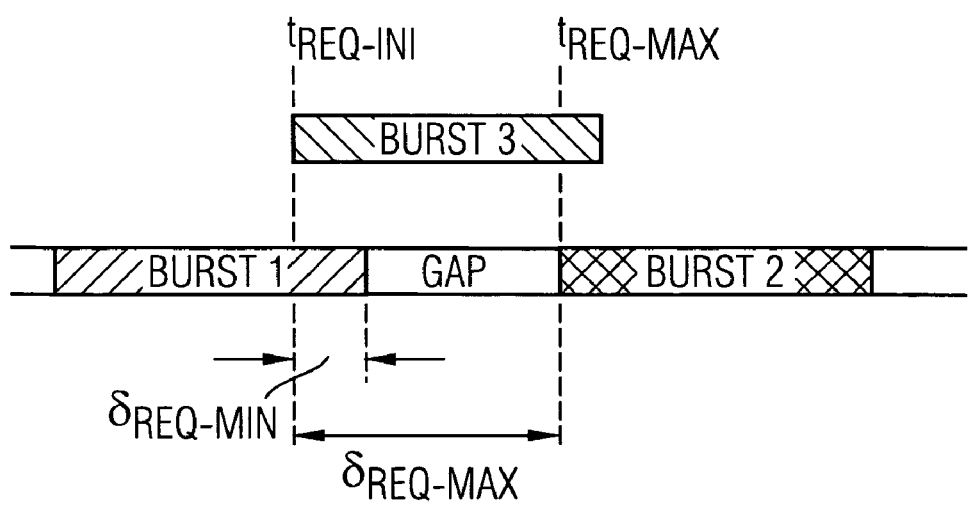
FIG. 4 is a time diagram relating to the JET algorithm.

In another method, the JET algorithm, the instants of the beginning and end of the data burst are registered. This enables a further data burst BURST3 to be transmitted between two data bursts BURST1 and BURST2 for which the transmission capacity has already been reserved. FIG. 4 elucidates this. There is a longer waiting time GAP between the data bursts BURST1 and BURST2. If the time of the possible beginning of sending the data burst BURST 3 is referred to as $t_{REQ-INI}$ and the sending end node A receives the remaining blocking time $\delta_{REQ-MIN}$ (the blocking time of the connection A-E corresponds in this example to the period of time until the end of BURST1, after which the connection will be free, and the time $t_{REQ-MAX}$ to the beginning of the next data burst BURST3, as of which the connection will no longer be available), then the sending end node A will be able to calculate the length of the GAP $GAP_{SIZE}=t_{REQ-MAX}-(t_{REQ-INI}+\delta_{REQ-MIN})$ and thus establish whether it can send the further data burst BURST3 within said waiting time (the free connection time GAP can also be calculated in the end node E etc. or determined based on a relative length of time $\delta_{REQ-MAX}$ until the end of an available connection). It is not the case in FIG. 4 and sending of the data burst BURST3 must be delayed. If there is no reservation for the data burst BURST2, then the time $t_{REQ-MAX}$ will be set to infinite and the data burst BURST3 can be sent with no further waiting time on expiration of the time $\delta_{REQ-MIN}$.

The times as of and up to when a data burst can be transmitted can be specified both as lengths of time "$\delta$" associated with specific time markers (sending of the acknowledgement signal, for example) and as absolute time values "t".

The invention claimed is:

1. A method for transmitting data bursts between a sending network node and a receiving network node over a switching device of a data network, comprising:
    transmitting a first data burst;
    transmitting a reservation request;
    transmitting an acknowledgement signal;
    wherein the sending network node receives information regarding a blocking time while transmitting the first data burst;
    wherein the reservation request and the acknowledgement signal includes information regarding the blocking time by means of a signalling overhead;
    waiting for expiration of the blocking time; and
    transmitting a second data burst from the sending network node to the receiving network node immediately after expiration of the blocking time.

2. The method according to claim 1, further comprising transmitting a remaining blocking time of a connection between the sending and receiving nodes to the sending network node.

3. The method according to claim 2, further comprising transmitting to the sending network node both:
    the point in time of the beginning of an available connection or the blocking time until the beginning of the available connection, and
    the point in time of the termination of the available connection or the duration of the available connection or a length of time until the end of the available connection are transmitted to the sending network node.

4. The method according to claim 2, wherein the blocking time and the remaining connection time for a connection are transmitted to the sending network node.

5. The method according to claim 4, wherein the data bursts are transmitted over an optical data network.

6. The method according to claim 2, wherein the sending network node sends the reservation request via the switching device to the receiving network node.

7. The method according to claim 6, wherein a desired length of time until a subsequent data burst is sent in the reservation request.

8. The method according to claim 7, wherein the data burst is transmitted via a plurality of switching devices.

9. The method according to claim 7, wherein each switching device determines and transmits the longest remaining blocking time to the next switching device or the receiving network node.

10. The method according to claim 7, wherein during the acknowledgement signal the receiving end node sends the remaining time till an available connection to the sending network node via the switching devices and the switching devices reserve the transmission capacity.

11. The method according to claim 10, wherein the reserved transmission capacity is based on the remaining time information.

12. A method for transmitting data bursts between a sending network node and a receiving network node over a switching device of a data network, comprising:
   transmitting a first data burst;
   transmitting a reservation request;
   transmitting an acknowledgement signal;
   transmitting to the sending network node information including
   the point in time of the beginning of an available connection or a blocking time of the existing connection until the beginning of an available connection, and
   the point in time of the termination of the available connection or the duration of the available connection or a length of time until the end of the available connection;
   wherein the sending network node receives said information regarding the blocking time while transmitting the first data burst;
   wherein the reservation request and the acknowledgement signal includes information regarding the blocking time by means of a signalling overhead;
   waiting for expiration of the blocking time; and
   transmitting a second data burst from the sending network node to the receiving network node immediately after expiration of the blocking time.

13. The method according to claim 12, wherein the blocking time is the time duration till the next permissible data burst transmission.

14. A method for transmitting data bursts between a sending network node and a receiving network node over a switching device of a data network, comprising:
   transmitting a first data burst;
   transmitting a reservation request;
   transmitting an acknowledgement signal;
   transmitting to the sending network node information containing the point in time of the beginning of an available connection or a remaining blocking time of an existing connection, and the duration of the available connection;
   wherein the reservation request and the acknowledgement signal includes information regarding the blocking time by means of a signalling overhead;
   wherein the sending network node receives said information regarding the blocking time while transmitting the first data burst;
   waiting for expiration of the blocking time; and
   then transmitting a second data burst from the sending network node to the receiving network node immediately after expiration of the blocking time.

* * * * *